United States Patent [19]

Chartrand et al.

[11] 4,353,845

[45] Oct. 12, 1982

[54] GAS SCRUBBER

[76] Inventors: Joseph A. Chartrand, St. Hugues, Province of Quebec, Canada, J0H 1N0; Irénée Perreault, 515 Casavant Blvd., West, Saint-Hyacinthe, Province of Quebec, Canada, G2S 7K1

[21] Appl. No.: 259,832

[22] Filed: May 4, 1981

[51] Int. Cl.³ .................. B01D 47/02; B01D 47/06; B01D 47/12

[52] U.S. Cl. .................................. 261/3; 261/118; 261/153; 261/DIG. 9; 55/126; 55/223; 55/228; 55/238; 55/248; 55/419; 55/428

[58] Field of Search .............. 55/122, 126, 223, 228, 55/238, 248, 257 R, 419, 428, 466; 261/3, 17, 118, 152, 153, DIG. 9

[56] References Cited

U.S. PATENT DOCUMENTS

| 3,246,452 | 4/1966 | Arvanitakis . | |
| 3,345,152 | 10/1967 | Appleman . | |
| 3,547,612 | 12/1970 | Westelaken et al. . | |
| 3,655,361 | 4/1972 | Brown et al. | 55/419 |
| 3,668,839 | 6/1972 | Misarek et al. | 55/223 |
| 3,710,551 | 1/1973 | Sued | 55/419 |
| 3,713,277 | 1/1973 | Sackett, Sr. | 261/118 |
| 3,942,970 | 3/1976 | O'Donnell . | |
| 3,963,471 | 6/1976 | Hampton . | |
| 4,124,021 | 11/1978 | Molitor | 55/DIG. 36 |
| 4,263,024 | 4/1981 | Velden et al. | 55/122 |
| 4,276,063 | 6/1981 | Lackey et al. | 261/DIG. 9 |

FOREIGN PATENT DOCUMENTS

| 89942 | 8/1904 | Canada . | |
| 108978 | 5/1914 | Canada . | |
| 637374 | 2/1962 | Canada . | |
| 801339 | 12/1968 | Canada . | |
| 1671393 | 5/1979 | Fed. Rep. of Germany | 261/118 |
| 53-14668 | 2/1978 | Japan | 55/223 |
| 56-48101 | 1/1981 | Japan | 55/223 |
| 579433 | 8/1946 | United Kingdom | 55/228 |

Primary Examiner—David L. Lacey

[57] ABSTRACT

A gas scrubber particularly adapted to purify a gas obtained by vaporization of a fluidizing content of wet organic wastes, comprising an upstream precipitation duct section and a downstream sedimentation section with water jets to enhance precipitation in the upstream duct section.

1 Claim, 6 Drawing Figures

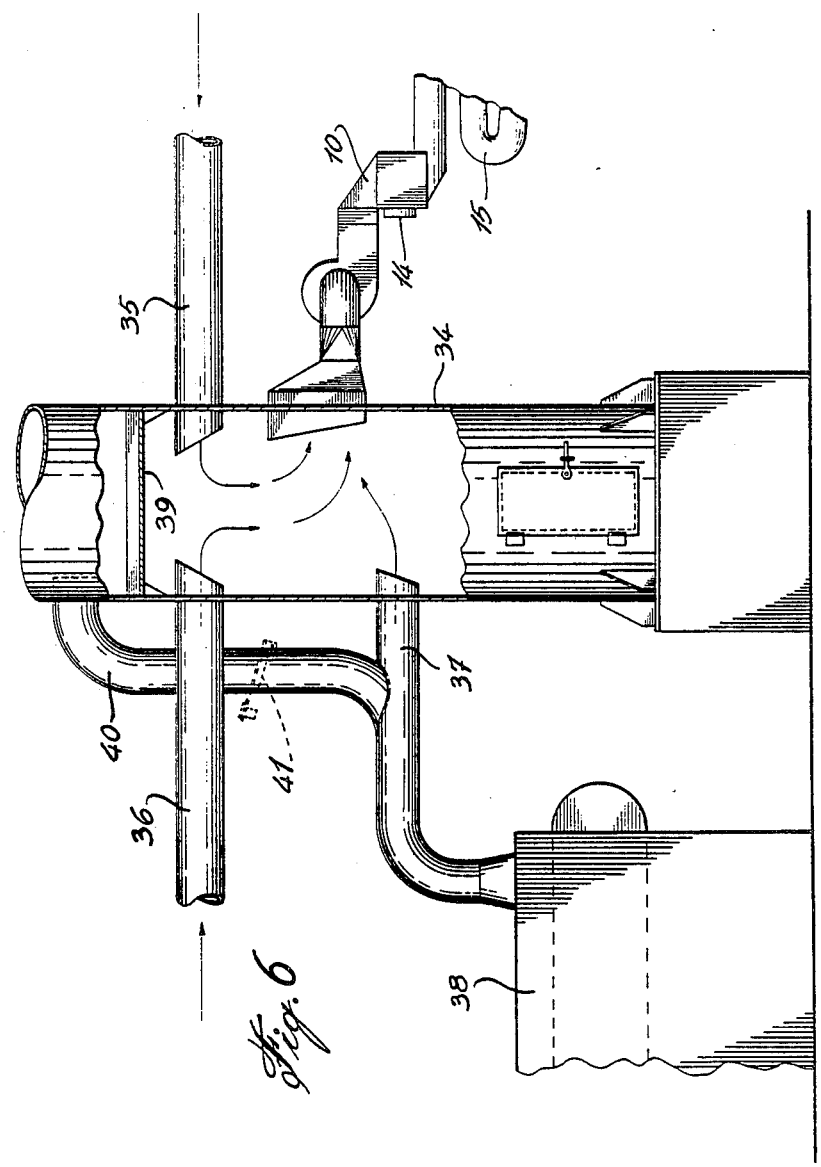

GAS SCRUBBER

This invention relates to an apparatus to purify a gas and known as a gas scrubber.

In the treatment of manure or the like wet organic wastes, the solid content is currently extracted and easily disposed of in a satisfactory way to protect the environment; this is not so with the fluid or fluidizing content of such organic wastes which thus remain substantially untreated and constitute a major pollutant. This is a major environmental problem specially where large herds are raised.

It is a general object of the present invention to provide a gas scrubber that is of simple and efficient operation and particularly adapted to satisfactorily purify a gas including the fluidizing content extracted by evaporation from wet organic wastes, such as manure or excreta.

It is another general object of the present invention to provide a gas scrubber that is particularly adapted to purify a heated gas.

It is a more specific object of the present invention to provide a gas scrubber that takes advantage of the heated state which is needed to vaporize a fluidizing content of wet organic wastes, by embodying two stages of purification comprising a precipitation stage and a sedimentation stage.

The above and other objects and advantages of the present invention will be better understood with reference to the following detailed description of a preferred embodiment thereof which is illustrated, by way of example, in the accompanying drawings, in which:

FIG. 6 illustrates another application of the gas scrubber of FIG. 1.

Figure 1:
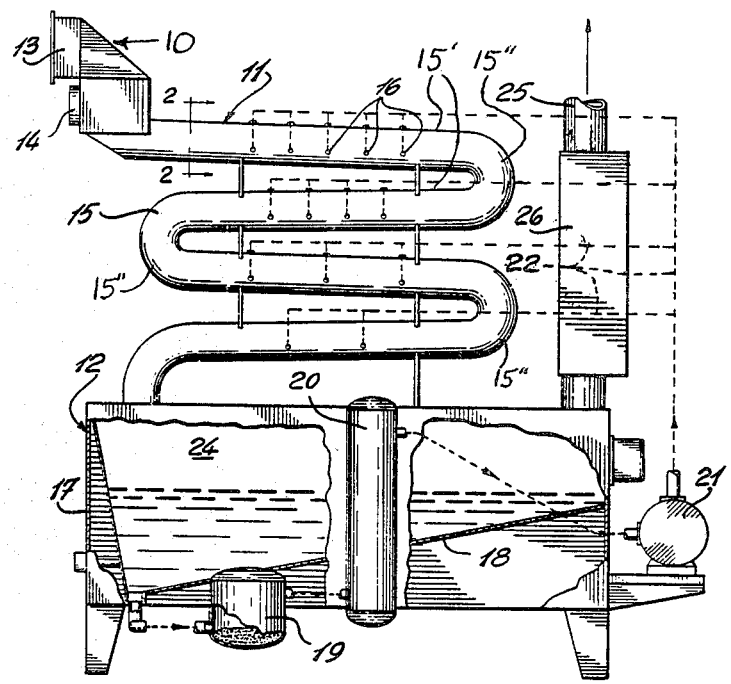
FIG. 1 is a side elevation view of a gas scrubber according to the present invention.
Figure 2:
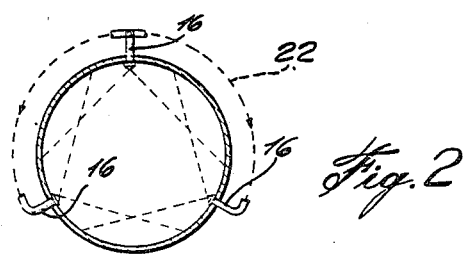
FIG. 2 is a cross-sectional view as seen along line 2—2 in FIG. 1.
Figure 3:
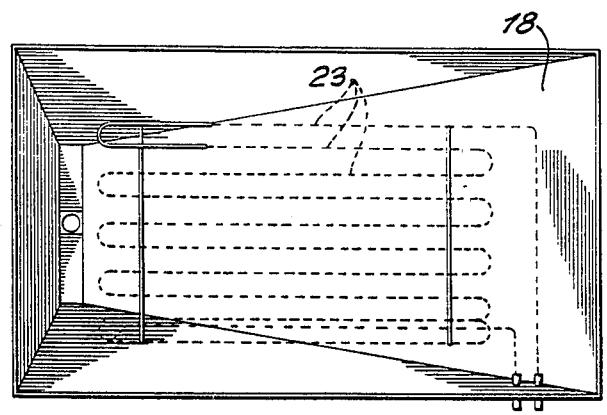
FIGS. 3 and 4 are plan and side elevation views respectively of a heat exchanger operatively mounted in the gas scrubber of FIG. 1.
Figure 4:
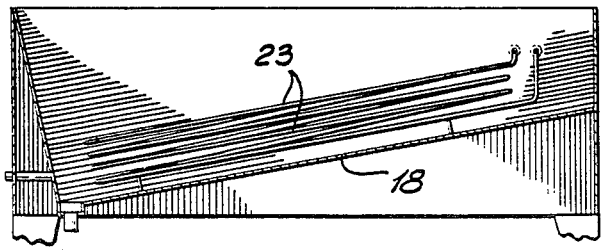

The illustrated gas scrubber includes a mixing a inlet box 10, an upstream precipitation duct section 11 and a downstream sedimentation section 12 located below section 11. The mixing inlet box 10 is provided with a pair of inlets 13, 14 for ingestion and mixing of two distinct gases to be treated in the precipitation section.

The precipitation duct section comprises a duct 15, in serpentine form, extending from an upper upstream end connected to the mixing inlet box 10 and a lower downstream end connected to the top of the sedimentation section 12. The precipitation duct 15 consists of several straight duct portions 15' serially connected by U-shaped duct portions 15''. The straight duct portions 15' are disposed one below the other and each continuously lowers from its upstream to its downstream end for gravity flow of the liquid precipitation in it. Water jets 16 extend into the precipitation duct 15 and are provided to enhance precipation of the heated gases flowing in the duct. The water jets are arranged in groups spaced apart one from another along the length of the precipitation duct 15. The water jets 16 of each group are arranged in a common transverse plane relative to the duct and inwardly extend radially and convergingly to form a water curtain in the corresponding transverse plane. Thus, the heated gas mixture flowing down the duct 15 is precipitated by passing through the successive water curtains defined by the successive groups of water jets.

The sedimentation section 12 includes a housing 17 in which is provided an elongated sedimentation tank 18 in which the precipitate from the duct 15 accumulates. The downward and of duct 15 communicates with the top of tank 18 at one end of the latter. The sedimentation tank 18 is drained through a filter unit 19 and a second sedimentation tank 20 by a pump 21 which is connected, as shown by the arrows and dashed lines 22, to recirculate the water or condensate through the water jets 16.

A heat exchanger 23 is immersed in the sedimentation tank 18 to recuperate heat and use it nearby. A gas compartment 24 overlies the sedimentation tank 18. A chimney 25 communicates with the gas compartment 24 to outwardly exhaust the non-precipitated gas. Chimney 25 is connected to the top of tank 18 at the end thereof which is opposite the end connected to duct 15. An electrostatic precipitator 26, of conventional construction, is serially connected to the chimney 25 to precipitate particles that have previously resisted precipitation in the precipitation duct 15 and gas compartment 24.

Figure 5:
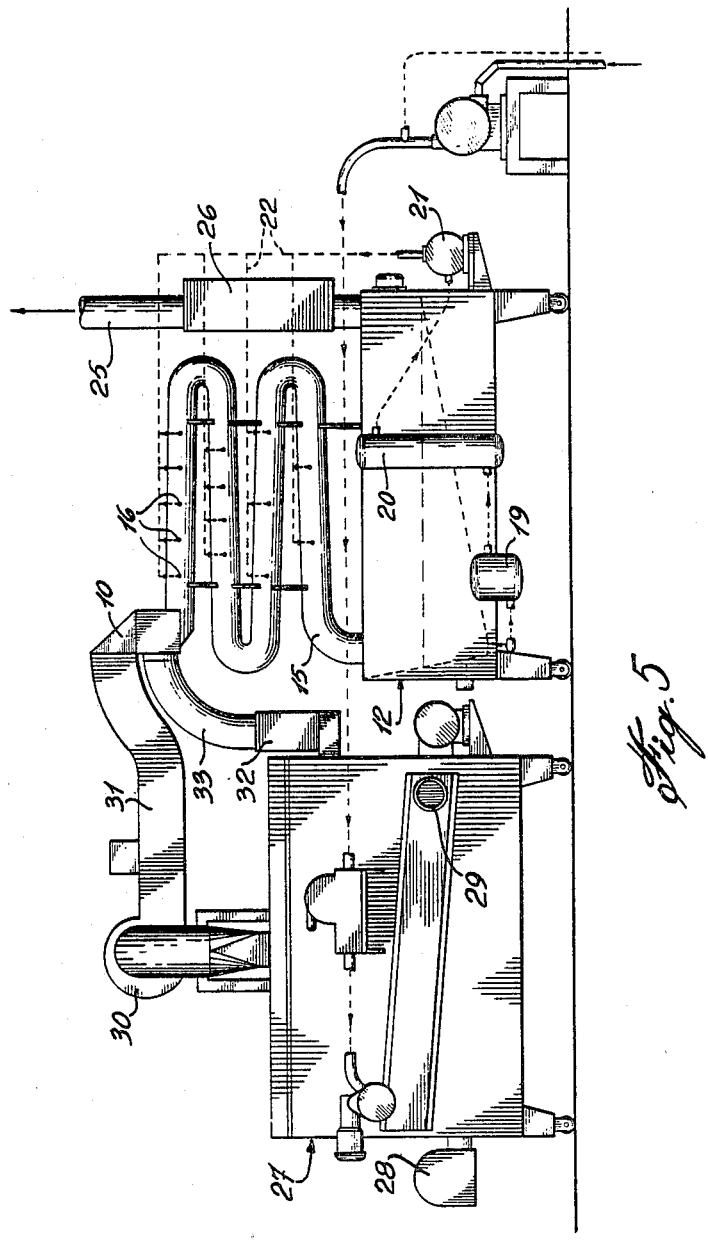
FIG. 5 is a side elevation view of an apparatus for recycling wet organic wastes, such as manure, and including a gas scrubber as shown in FIG. 1.

FIG. 5 illustrates one application of the aforedescribed gas scrubber where the latter is used to treat or purify the fluidizing content and the combustion gases issuing from a furnace treating wet organic wastes to extract the solid content from it and recycle the same as soil conditioner or organic fertilizer. The furnace 27 is particularly conceived to treat manure, such as from a piggery. It includes a burner 28 to dry the solid content and vaporize the fluidizing content. The solid content comes out through an outlet tube 29; the fluidizing content is blown out by a blower 30 and a duct 31, and the combustion gas issues through a chimney 32 and a duct 33. The ducts 31 and 33 are connected to the inlets 13 and 14, respectively, of the mixing inlet box 10.

A more complete description of the manure recycling furnace 27 may be found in co-pending patent application Ser. No. 06/259,833, filed May 4, 1981, by the same applicants and is incorporated by reference in this patent application.

FIG. 6 illustrates another application of the aforedescribed gas scrubber which is only partly represented by its elements 10, 14, and 15. In this case, the gas scrubber is connected to the chimney 34 of a factory into which chimney all potentially harmful gases and fumes are fed. For instance, the chimney 34 may receive, by a duct 35, toxic gases coming from shops, such as a paint shop, a welding shop and/or a chemical treatment shop. A duct 36 may feed in odors or harmful gas from the factory. Another duct 37 may feed in the combustion gas from a boiler 38. The combustion gas may be sent above the partition 39 in the chimney to be directly evacuated, if the need arises, by means of a duct 40 and a safety valve 41 in the latter.

Thus, all gases fed into the chimney below the partition 39 are treated and purified by the gas scrubber before release to the atmosphere.

What we claim is:

1. A gas scrubber for hot gases, comprising an upstream precipitation section and a downstream sedimentation section located below the precipitation section and consisting of an elongated tank, water contained in said tank, the latter defining a gas compartment above said water, said precipitation section consisting of a serpentine duct comprising a plurality of straight duct portions disposed one below the other, said serpentine duct having an upper inlet and a lower outlet for the hot gases flowing therethrough, each straight duct portion downwardly inclined in the direction of gas flow, said lower outlet communicating with the top of said tank at one end thereof, a gas exhaust chimney communicating with the top of said tank at the opposite end thereof, a plurality of groups of water jets extending into each straight duct portion, and longitudinally spaced along the same, the water jets of each group being spacedly arranged in a common transverse plane relative to each straight duct portion and inwardly extending radially and convergingly to form a water curtain in the corresponding transverse plane, the hot gasses passing through the successive water curtains and the water from said water curtains flowing under gravity along said straight and said U-shaped duct portions into said tank so as to form a layer of water in said straight duct portions, pump means for recirculating the water in said tank through said water jets, and a heat exchanger in the water of said tank to recuperate the heat from said water for external use.

* * * * *